United States Patent [19]

Höpfner

[11] 4,079,399
[45] Mar. 14, 1978

[54] CONTROL MECHANISM FOR A RETRACTABLE VIEWFINDER

[76] Inventor: Clemens Höpfner, 60 Wangen 7, Stuttgart, Germany

[21] Appl. No.: 659,801

[22] Filed: Feb. 20, 1976

[30] Foreign Application Priority Data

Feb. 28, 1975 Germany .............................. 7506293

[51] Int. Cl.² .............................................. G03B 13/14
[52] U.S. Cl. .................................... 354/221; 354/187; 354/199
[58] Field of Search ............... 354/187, 188, 189, 190, 354/191, 192, 193, 194, 199, 219, 221

[56] References Cited

U.S. PATENT DOCUMENTS

| | | | |
|---|---|---|---|
| 2,355,136 | 8/1944 | Bedford | 354/221 |
| 2,519,195 | 8/1950 | Maurer | 354/221 |
| 2,549,195 | 4/1951 | Hansen | 354/221 |
| 2,973,700 | 3/1961 | Gebele | 354/221 |
| 2,995,061 | 8/1961 | Briskin et al. | 354/221 |
| 3,174,418 | 3/1965 | Faasch et al. | 354/188 |
| 3,921,189 | 11/1975 | Gallistel | 354/223 |

FOREIGN PATENT DOCUMENTS 2,362,429   6/1975   Germany ............................ 354/219

Primary Examiner—L. T. Hix
Assistant Examiner—Alan Mathews
Attorney, Agent, or Firm—J. A. Morrow

[57] ABSTRACT

A retractable viewfinder for a camera includes a control mechanism which provides compensation or correction for parallax as the objective lens of the camera is focused.

9 Claims, 2 Drawing Figures

CONTROL MECHANISM FOR A RETRACTABLE VIEWFINDER

BACKGROUND OF THE INVENTION

1. Field Of The Invention

The present invention relates to a retractable viewfinder for a camera and, more particularly, to a control mechanism for a retractable viewfinder which provides parallax correction responsive to focusing of the objective lens.

2. Description Of The Prior Art

Camera viewfinders which provide parallax correction responsive to focusing of the objective lens are well known in the prior art. However, the known viewfinder mechanisms are not retractable in the manner disclosed herein to provide a compact camera. Furthermore, the known prior art does not disclose a control mechanism for correcting for parallax which permits the viewfinder to be retracted in a similar manner to that now disclosed.

SUMMARY OF THE INVENTION

Accordingly, a preferred embodiment of the present invention provides viewfinder suitable for use with a camera, the viewfinder being adapted to be moved relative to the body of the camera between an extended position wherein desired scenes may be viewed and a retracted position wherein the viewfinder is nested within a portion of the body of the camera.

An object of the present invention is achieved through an improved viewfinder adapted for a camera, the viewfinder being movable between an extended and a retracted position and being adapted to provide automatic parallax correction in response to adjustment of the objective lens of the camera for focusing.

Still a further object is realized by incorporation into a retractable viewfinder for a camera a control mechanism which provides for parallax correction responsive to movement of the camera objective lens for focusing, the control mechanism being adjustable within a predetermined range.

The invention and its objects and advantages will become more apparent in the detailed description of the preferred embodiment presented below.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 1:
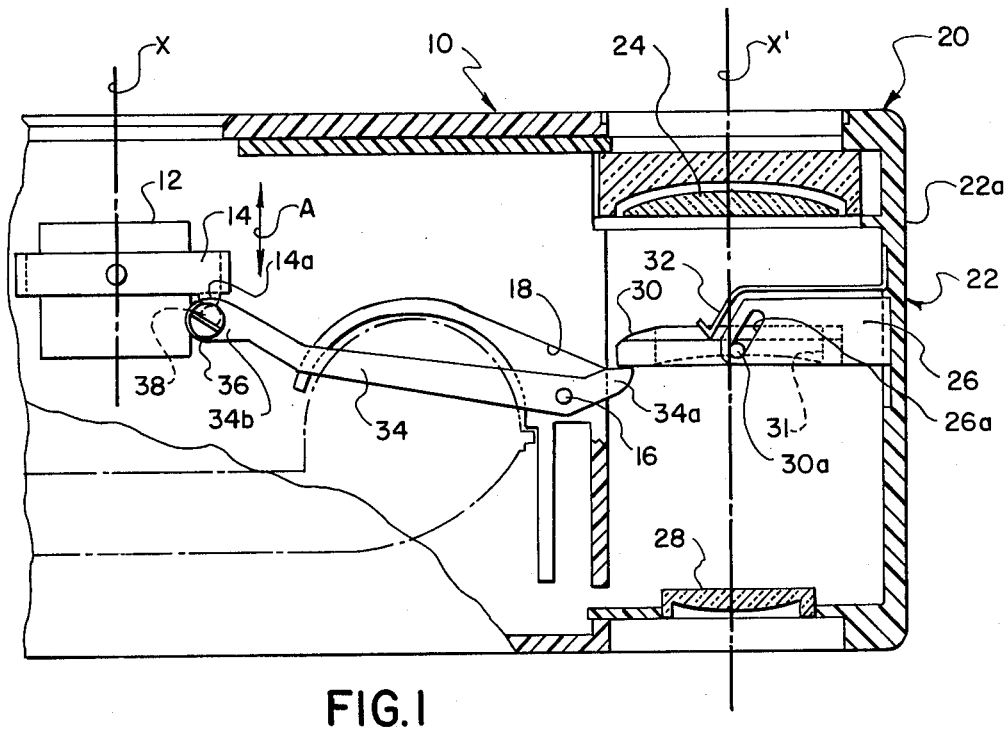
FIG. 1 is a cross-sectional view of a still camera including a preferred embodiment of a retractable viewfinder which is shown in an extended or operative position.

Referring now to FIG. 1, a still camera 10 is depicted with an attached retractable viewfinder 20 in an extended or operative position wherein an operator may view a scene which the operator desires to photograph. Camera 10 preferably includes an objective lens 12 which is movable along the optical axis X to focus the image onto a recording member in a manner well known. In the embodiment of the camera illustrated, the lens 12 is supported by a setting bracket or mounting 14 which includes a camming surface 14a. Preferably, camming surface 14a cooperates with a control mechanism to compensate or correct for parallax between the lens 12 and the viewfinder 20 as will be described.

The viewfinder 20 preferably includes a housing 22 which includes a wall 22a that forms a lateral wall for the camera when the viewfinder is in its storage (FIG. 2) position. Preferably, the housing 22 of the viewfinder 20 is slidably supported by the camera 10 for movement between the operative (FIG. 1) position and the storage (FIG. 2) position.

As shown in FIG. 1, the direct optical viewfinder 20 is of the inverted Galilean system type having a viewing axis X' which is parallel to the optical axis X. The negative front lens 24 and the positive ocular lens 28 are both rigidly carried by the housing 22 of the viewfinder 20. As illustrated, sufficient room is provided within the body of the camera 10 to receive the lenses 24 and 28 when the viewfinder is moved to the storage (FIG. 2) position.

Between the front lens 24 and the ocular lens 28 there is mounted a supporting bracket 26. As illustrated, a parallax correcting element or concave mirror 30 has a pin 30a attached thereto which extends into an angular slot 26a in an arm of the supporting bracket 26. If desired, the supporting bracket may include a second arm (not illustrated) which similarly supports the parallax correcting element 30 on the underside such that the lens is pivotally and slidably mounted through the pin and slot connections. Preferably, the viewfinder housing 22 further includes a resilient member 32 which cooperates with element 30 to urge it in a counterclockwise direction about the pin 30a toward the position shown in FIG. 1.

In the preferred embodiment of the retractable viewfinder, the concave mirror or parallax correcting element 30 is provided with a central opening 31 for the unhindered passage of light rays along the viewing axis X'. Accordingly, the mirror 30 includes only a narrow mirror frame. The size of the opening 31 is such that picture area limits are clearly depicted in the viewfinder image plane.

Preferably, a control lever 34 of the control mechanism is pivotally mounted to the body of the camera 10 by a rivet 16 which passes through an opening (not shown) in the control lever 34.

As illustrated, control lever 34 includes first and second spaced arms 34a and 34b. As will be further described, the first arm 34a of the control lever 34 is positioned to cooperate with the parallax correcting element 30 and the second arm 34b through an attached cam follower 36 is positioned to cooperate with the camming surface 14a of the mounting 14.

When the viewfinder 20 is in the operative (FIG. 1) position, a portion of the parallax correcting element 30 is maintained in pressure contact with the first arm 34a of a control lever 34 through the urging of the resilient member 32. The cam follower 36, which is adjustably affixed to the second arm 34b of the control lever 34, is resiliently maintained in contact with the camming surface 14a of the mounting 14 by the force of the resilient member 32 which is transmitted through element 30 and the control lever 34.

With the viewfinder 20 in the operative (FIG. 1) position, the operator can view through the ocular lens 28 the scene intended to be photographed through the objective lens 12. To adjust the focus of the objective lens 12, the lens is moved by the operator along the optical axis X in the directions indicated by the double headed arrow A. As the objective lens 12 is moved, the cam follower 36 cooperates with and follows the contour of camming surface 14a to control or compensate for parallax as will now be described.

Movement of the objective lens 12 results in the control lever 34 being pivotally rotated about rivet 16 by the cam follower 36 responsive to movement camming surface 14a. If the objective lens 12 is moved inward, the control lever 34 moves in a counterclockwise direction about rivet 16 responsive to movement of the cam follower 36 and arm 34a of the control lever 34 urges the parallax correction element 30 in a clockwise direction about pin 30a against the urging of the resilient member 32. Contrariwise, if the objective lens 12 is moved outward, resilient member 32 urges the parallax correcting elements 30 in a counterclockwise direction about pin 30a maintaining cam follower 36 in engagement with the camming surface 14. In this manner, the parallax correcting element 30 may be pivotally and movably adjusted through the pin and slot arrangement to adjust the image scene viewed through viewfinder 20 to be in correspondence with the scene to be photographed through the objective lens 12.

In the preferred embodiment of the viewfinder illustrated, the cam follower 36 is eccentrically mounted to the control lever 34 by a screw 38 or other mechanical adjusting means. Through proper adjustment or calibration of the cam follower 36, movement of parallax correction element 30 can be calibrated to closely correlate with the movement of the objective lens 12 of the camera to provide parallax correction through the full range of movement of the objective lens 12. Of course, other adjustment means may be provided but with a proper selection of the length of the control lever 34 and placement of the pivoting point 16, further adjustment means should not be required.

Figure 2:
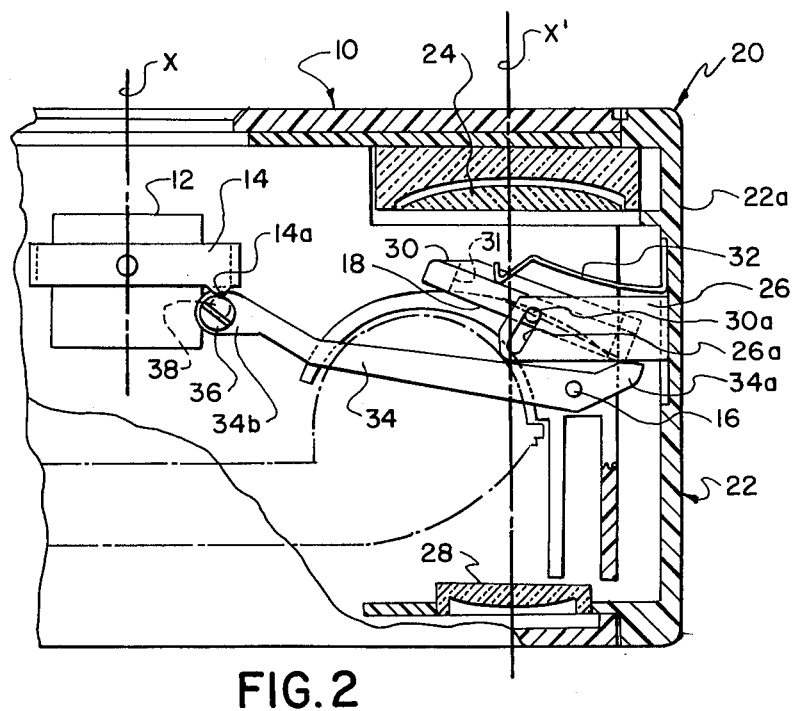
FIG. 2 is a view similar to FIG. 1 showing the viewfinder in a retracted or storage position.

Through cooperating structures of the viewfinder 20 and the camera 10, the viewfinder 20 can be moved by the operator between the operative (FIG. 1) position and a storage (FIG. 2) position wherein the overall size of the camera is decreased, by the viewfinder being nested within a part of the body of the camera 10. As shown in FIG. 2, movement of the viewfinder 20 relative to the body 10 of the camera results in displacement of the parallax correction element 30 to a stored position. In the preferred embodiment, the parallax correction element 30 cooperates with an inclined portion 18 of the camera 10 to displace the element 30 against the urging of the resilient member 32 as the viewfinder is moved toward the storage (FIG. 2) position. The particular method of displacement of the element 30 may be dependent upon the relationships between the viewfinder 20 and camera 10.

I claim:

1. In combination, a retractable viewfinder and a camera having a variable focus objective lens defining a taking axis, said viewfinder comprising:
   a. a housing supported by the camera for movement generally perpendicular to the taking axis between (1) a retracted position wherein said viewfinder is compactly stored with respect to the camera and (2) an extended position wherein said viewfinder permits viewing of a scene along a viewing axis which is generally parallel to said taking axis;
   b. a parallax correction element supported by said housing for movement relative thereto between (1) a stored position when said housing is in its retracted position and (2) a viewing position when said housing is in its extended position, said parallax correction element being further supported by said housing for movement relative thereto within a range of positions when said housing is in said extended position to correct for parallax;
   c. means for moving said parallax correction element between said stored and viewing positions responsive to movement of said housing between said retracted and extended positions respectively; and
   d. means operatively coupling said objective lens to said parallax correction element when said parallax correction element is in said viewing position for moving said parallax correction element within said range of positions to correct for parallax as said objective lens is focused.

2. The combination as set forth in claim 1 wherein said means for moving said parallax correction element means between said stored and viewing positions comprises resilient means supported by said housing, said resilient means being effective to urge said parallax correction element toward said viewing position.

3. The combination as set forth in claim 2 further comprising fixed front and rear lens elements carried by said housing, said parallax correction element comprising a concave mirror having a light-transmitting portion defined therein, and said parallax correction element being positioned intermediate said front and rear elements and being movable relative to said viewing axis to correct for parallax.

4. The combination as set forth in claim 1 wherein said means operatively coupling said objective lens and said movable element comprises a control lever which has a first portion engageable with said objective lens and a second portion engageable with said parallax correction element, said control lever being movable responsive to movement of said objective lens whereby said second portion moves said element in said viewing position to compensate for parallax.

5. In combination, a camera having an adjustable objective lens defining a taking axis and a retractable viewfinder comprising:
   a. a viewfinder housing supported by said camera for movement generally perpendicular to said taking axis between (1) a retracted or storage position wherein said viewfinder is nested with respect to the camera and (2) an extended or viewing position wherein scenes to be recorded through the objective lens of the camera may be viewed;
   b. fixed front and rear elements supported by said viewfinder housing, said fixed elements defining a viewing axis generally parallel to said taking axis;
   c. a movable parallax correction element supported by said viewfinder housing intermediate said fixed front and rear elements, said movable parallax correction element being supported for movement relative to said viewfinder housing between (1) a stored position when said viewfinder housing is in said retracted position and (2) a viewing position when said housing is in its extended position and being movable in said viewing position relative to said viewing axis within a range of positions to correct for parallax;

d. resilient means supported by said housing, said resilient means for urging said movable element toward said viewing position; and e. means operatively coupling said objective lens of the camera and said movable parallax correction element of said viewfinder, said movable parallax correction element being displaceable within said range of positions by said coupling means to correct for parallax responsive to movement of said objective lens.

6. In combination, a camera of the type having an adjustable focus objective lens defining a taking axis and a viewfinder comprising:

a. a viewfinder housing supported by said camera for movement generally perpendicular to the taking axis between (1) a storage position wherein said viewfinder housing is at least partially received by said camera and (2) an extended position wherein said viewfinder is suitable for viewing a scene along a viewing axis which is generally parallel to said taking axis;

b. a parallax correction element supported by said housing for movement between (1) a stored position when said housing is in said storage position and (2) a viewing position wherein said parallax correction element is movable relative to said housing within a range of positions when said housing is in an extended position to correct for parallax; and c. means operatively coupling said objective lens and said parallax correction element, said means being responsive to movement of said objective lens to position said parallax correction element within said range of positions when said housing is in its extended position.

7. The combination as set forth in claim 6 wherein said parallax correction element is displaceable from said range of positions when said housing is moved to said storage position.

8. The combination as set forth in claim 7 wherein said objective lens includes a cam surface and wherein said means operatively coupling said objective lens and said parallax correction element comprises a lever having affixed thereto a cam follower adapted to cooperate with said cam surface to displace said lever responsive to movement of said objective lens, said lever further adapted to cooperate with said parallax correction element to position said element within said range of positions when said housing is in an extended position.

9. The combination as set forth in claim 8 wherein said cam follower is adjustable to calibrate the movement of said parallax correction element relative to movement of said objective lens.

\* \* \* \* \*